A. A. HALL.
CHAIN LINK.
APPLICATION FILED MAR. 26, 1915.

1,185,659.  Patented June 6, 1916.

WITNESSES:
Charles Eberhart
Jessie B Kay

INVENTOR
Alfred A Hall
BY
Harry L Duncan ATTORNEY

UNITED STATES PATENT OFFICE.

ALFRED A. HALL, OF BRIDGEPORT, CONNECTICUT, ASSIGNOR TO AMERICAN CHAIN COMPANY, INCORPORATED, OF BRIDGEPORT, CONNECTICUT, A CORPORATION OF NEW YORK.

CHAIN-LINK.

1,185,659. Specification of Letters Patent. Patented June 6, 1916.

Application filed March 26, 1915. Serial No. 17,092.

*To all whom it may concern:*

Be it known that I, ALFRED A. HALL, a citizen of the United States, and resident of Bridgeport, Fairfield county, State of Connecticut, have made a certain new and useful Invention Relating to Chain-Links, of which the following is a specification, taken in connection with the accompanying drawing, which forms part of the same.

This invention relates especially to chain links having a diagonal shank which is preferably straight and having the ends of the link material extending diagonally across the shank on opposite sides thereof, the tip on each end being, if desired, brought up through the notch between the shank and the other end and brought down upon its straight portion to form more or less closed parallel securing loops around the central part of the shank, these securing loops being in substantial contact with each other and being if desired more securely held together as by galvanizing the link or applying thereto some other suitable protecting metal coating.

Figure 1:
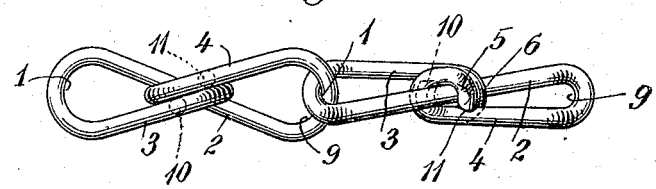
Figure 2:
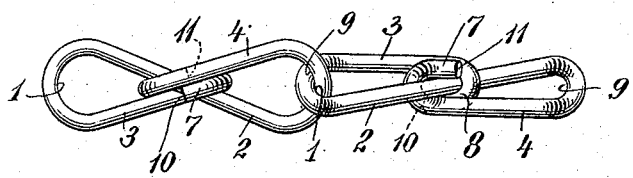

In the accompanying drawing showing in a somewhat diagrammatic way several illustrative embodiments of this invention, Figure 1 shows several links of one form in which the securing loops are substantially closed; and Fig. 2 shows another modification in which the parallel securing loops are interlocked around the central part of the shank without being entirely closed.

The steel wire or other suitable link material is cut to the desired length and bent preferably so that its middle portion forms a substantially straight shank 2 extending diagonally across the link, the ends 3, 4 extending diagonally across the shank on opposite sides thereof and secured or interlocked in suitable manner while remaining in substantial contact with each other, thus forming the eyes 1, 9 at each end of the link for engagement with adjacent links of the chain. As shown in Fig. 1 closed parallel securing loops may be formed on each end by bringing it up through the notch between the shank and the other end and carrying it over the shank so as to be substantially parallel to its straight portion and then bending it down upon its straight portion so that the tip 11 is in substantial contact with the straight portion of the end 4 and the tip 10 substantially engages the end 3. This gives a neat and pleasing form of link which is amply strong for many purposes and which may be still further stiffened and strengthened by uniting the parallel securing loops in any suitable way as for instance during the galvanizing process, the galvanizing or other suitable coating material serving to unite these loops at their points of contact, or if desired electric welding may be resorted to to spot weld together parts of these securing loops.

Fig. 2 shows another construction in which the parallel securing loops are interlocked with each other and with the shank by being looped around the central part of the shank on opposite sides of the same, each of the terminal or tip portions such as 11 being preferably substantially parallel to the connected straight portions of the end such as 4, the terminal portion adjacent the tip 10 being also substantially parallel to its end 3. These parallel securing loops may be similarly united by galvanizing or other coating material or by welding, if desired.

This invention has been described in connection with a number of illustrative embodiments, forms, proportions, sizes and arrangements of parts and methods of manufacture, to the details of which disclosure the invention is not of course to be limited, since what is claimed as new and what is desired to be secured by Letters Patent is set forth in the appended claims.

I claim—

1. The chain link formed of wire stock and having a substantially straight diagonal shank and connected ends extending diagonally across said shank on opposite sides of the same and each having a tip brought up through the notch between said shank and the other end and extending over said shank substantially parallel to its straight portion and bent down upon the straight portion of the connected end to form closed parallel securing loops around the central part of the shank and in substantial contact with each other, said securing loops being secured together and to the adjacent portions of the shank by galvanizing coating material.

2. The chain link formed of wire stock and having a substantially straight diagonal shank and connected ends extending diagonally across said shank on opposite sides of the same and each having a tip brought up through the notch between said shank and the other end and extending over said shank substantially parallel to its straight portion to form parallel securing loops around the central part of the shank and in substantial contact with each other, said securing loops being secured together and to the adjacent portions of the shank by galvanizing coating material.

3. The chain link formed of wire stock and having a diagonal shank and connected ends extending diagonally across said shank on opposite sides of the same and each having a tip brought up through the notch between said shank and the other end and extending over said shank substantially parallel to its straight portion and bent down upon the straight portion of the connected ends to form closed parallel securing loops around the central part of the shank and in substantial contact with each other.

4. The chain link formed of wire stock and having a diagonal shank and connected ends extending diagonally across said shank on opposite sides of the same and each having a tip brought up through the notch between said shank and the other end and extending over said shank substantially parallel to its straight portion to form parallel securing loops around the central part of the shank and in substantial contact with each other.

A. A. HALL.

Witnesses:
RUBENA JOHNSON,
WALTER F. FITZGERALD.

Copies of this patent may be obtained for five cents each, by addressing the "Commissioner of Patents, Washington, D. C."